United States Patent [19]
Walling et al.

[11] Patent Number: 5,606,453
[45] Date of Patent: Feb. 25, 1997

[54] OPTICAL PARAMETRIC AMPLIFIERS AND OSCILLATORS PUMPED BY TUNABLE LASER SOURCES

[75] Inventors: John C. Walling, Whitehouse Station, N.J.; Jui T. Lin, Winter Springs, Fla.; Mahendrakumar G. Jani, Poquoson, Va.; Richard C. Powell, Tucson, Ariz.; Donald F. Heller, Bound Brook, N.J.

[73] Assignee: Light Age, Inc., Somerset, N.J.

[21] Appl. No.: 49,955

[22] Filed: Apr. 20, 1993

[51] Int. Cl.$^6$ .............................. H01S 3/10; H03F 7/00
[52] U.S. Cl. ...................... 359/330; 359/256; 359/349; 372/21
[58] Field of Search ...................... 359/256, 326, 359/330, 333, 349; 385/122; 372/21, 23

[56] References Cited

U.S. PATENT DOCUMENTS

| | | | |
|---|---|---|---|
| 3,662,183 | 5/1972 | Ashkin et al. | 359/330 |
| 4,639,923 | 1/1987 | Tang et al. | 372/21 |
| 5,134,622 | 7/1992 | Deacon | 372/21 |
| 5,265,116 | 11/1993 | Mooradian | 372/75 |

OTHER PUBLICATIONS

Kato et al, Optics Letters, vol. 17, #3, Feb. 1, 1992, pp. 178–179.

Jani et al, Appl. Phys. Lett, vol. 60, #19, pp. 2327–2329, May 11, 1992.

Jani et al, Appl. Opt. vol. 31, #12, pp. 1998–2000, Apr. 20, 1992 (Abst. only provided).

Kay et al, Proc. SPIE, Int. Soc. Opt. Eng., vol. 1869, pp. 201–210, Jan. 21, 1993 (Abst. only herewith).

*Primary Examiner*—Nelson Moskowitz
*Attorney, Agent, or Firm*—Morgan & Finnegan, L.L.P.

[57] ABSTRACT

Tunable optical parametric amplifiers and oscillators that are pumped by the light from a tunable laser source are disclosed. One possible embodiment uses a tunable solid-state laser pump and an OPA medium or nonlinear crystal, such as potassium titanyl phosphate KTP or barium borate BBO or lithium borate LBO. The second harmonic output from a tunable solid-state laser is also used to pump the OPA medium. A singly or doubly resonant cavity design is preferably used to reduce the oscillation threshold (i.e., the required pump beam power) of the OPO.

46 Claims, 6 Drawing Sheets

OPTICAL PARAMETRIC AMPLIFIERS AND OSCILLATORS PUMPED BY TUNABLE LASER SOURCES

FIELD OF THE INVENTION

The present invention relates to optical parametric amplifiers and optical parametric oscillators which are pumped by a tunable laser source.

BACKGROUND OF INVENTION

Optical parametric amplification (OPA) is a general process whereby a sufficient intensity of light at one wavelength (or frequency), the pump wavelength, is used to establish optical gain at other (longer) wavelengths in a material having a non vanishing nonlinear susceptibility. (References 1 to 4) OPA is conceptually similar to parametric amplification processes that were well-known to occur at radio frequencies. However, the physical process underlying OPA differs fundamentally from the radio frequency counterpart, due in part to the difficulty in obtaining highly coherent (long coherence length) light sources and materials and conditions under which light waves at different wavelengths can strongly interact.

The relatively weak nonlinearities of optical materials made OPA impractical until the advent of very intense optical sources brought about by the invention of the laser. Like excited laser media OPA's exhibit optical gain and amplify light.

In standard laser, (gain) media energy is supplied by an external source, e.g., a flashlamp, an electron current, or another laser. (References 3 and 5) In OPA, the energy to produce gain is supplied by an optical pump source, to date always a laser, but here the pump laser light is coherently coupled to the output light fields produced by the OPA.

The coupling and the gain established in the OPA gain medium (nonlinear material) depends on the intensity and phase of the pump field. In a suitable nonlinear material, usually a birefringent crystal with a nonvanishing second order nonlinear susceptibility, optical gain (and thus amplification) is established at two wavelengths when the pump beam is characterized by a single wavelength. These two wavelengths, conventionally referred to as the "signal" and the "idler" wavelength, are such that their corresponding frequencies when added are equal to the pump frequency (conservation of energy). The "signal" and "idler" waves are symmetric in that one photon of each is created from each photon of pump light that is converted by the OPA process. While their wavelengths usually differ, they need not (the degenerate case). Practically there is no physical distinction between what is termed signal and what is termed idler except that "signal" usually refers to the wavelength most desired, if there is one.

Useful gain, gain established over path lengths longer than the order of the wavelength, occurs only for those propagation directions within the crystal where the pump beam and the signal and idler beams can propagate and stay in phase. Optical materials generally exhibit a property called dispersion in which the refractive index varies with wavelength. Normally, shorter wavelength light waves propagate in these materials at slower velocities than longer wavelength light waves. Consequently, as they propagate light beams with different wavelengths move in and out of phase and there is no appreciable build up of gain even for exceedingly high intensities of the pump beam.

However, in certain birefringent materials, for particular temperatures and propagation directions, the difference in refractive index between ordinary and extraordinary waves can be used to offset the effects of dispersion at certain wavelengths, and phase coherence can be maintained as the beams propagate. This is called phase-matching. Under phase-matched conditions appreciable gain can build up at the signal and idler wavelengths if the pump beam is sufficiently intense. If optical feedback is provided, for example by using mirrors reflective at the idler or signal wavelengths (singly resonant condition) or at both wavelengths (doubly resonant condition) optical parametric oscillation or lasing can occur. The first demonstration of an optical parametric oscillator (OPO) was by Giordmaine and Miller in 1965 (Reference 1, cited hereinabove).

Although avidly pursued during the 1970's and 1980's, optical parametric amplification and oscillation did not quickly mature into broadly useful devices. This was due primarily to the lack of suitable nonlinear materials that could support efficient parametric frequency (energy) conversion processes at optical intensities below those that caused (optical) damage. Nonetheless, some research grade devices were demonstrated in a variety of nonlinear crystals. These devices produced tunable light from fixed frequency (wavelength) pump sources.

Tuning is possible because the pump beam can induce optical gain at any pair of wavelengths that conserve (photon) energy, and gain can build up if phase matching can be maintained. Since the index of refraction of a light beam polarized along the extraordinary direction in a birefringent material depends on its direction of travel with respect to the principal optical axes, the spatial orientation of the OPA material with respect to the propagation and polarization directions of the pump beam determines the wavelengths (and polarizations) of the signal and idler that can experience gain build up for any fixed pump wavelength. Tuning of the signal and idler wavelengths for fixed pump wavelength is most typically achieved by changing the angular orientation of the OPA crystal with respect to the direction of propagation of the pump beam. An alternative method of achieving phase-matching and of tuning an OPA or OPO is to vary the temperature of the crystal. Other methods that use external means, such as electric or magnetic fields, pressure, etc., to affect the crystal's refractive indices also could be exploited to phase-match and tune.

Although to date many useful devices have been based upon this method, a number of problems inherent to the angle tuning method arise. Since the crystal angle must be changed during tuning, the beams (pump, signal, and idler) can undergo angular deflection. This leads to requirements for precise angular compensation, since the stability of (singly and even more strongly doubly resonant) OPO's are critically dependent on the alignment of these beams. Angle tuning also requires larger aperture nonlinear crystals to be used than would otherwise be needed. Moreover, tuning the crystal requires precise fine mechanical motion. This is hard to do reliably and reproducibly and cannot be done quickly.

When the pump beam is tuned the OPO changes wavelength essentially immediately (within the build up time of the output fields, typically nanoseconds). In the past, reported and/or demonstrated OPA and OPO devices were based on fixed frequency pump beams. (References 5 to 9) Tunable laser sources were converted to other (tunable) wavelengths using nonlinear mixing processes such as sum- and difference frequency generation. The distinction between OPA and nonlinear mixing processes is discussed by reference 2, Byer and Herbst, *Non-Infrared Generation*, Topics In Applied Physics (Series), vol. 16, pp. 81–137 (1977).

Until the 1980's, the only tunable lasers sufficiently developed to be commercially useful were lasers based upon optically pumped solutions of dyes. While a few tunable solid state lasers, based on color centers in crystalline hosts, were in use these were largely limited to low power and/or low temperature operation. In the 1980's a new class of tunable solid-state lasers emerged. These lasers are based largely on (transition) metal ion impurities that interact vibronically with their crystal host. (Reference 10, J. C. Walling, Tunable Paramagnetic-Ion Solid-State Lasers", in Tunable Lasers Topics In Applied Physic (Series) vol. 59, pp. 331–398 (1987)). The first of these tunable vibronic solid-state laser materials that was sufficiently robust for commercial application was alexandrite. Subsequently many other tunable vibronic solid-state materials were discovered, and a few of these have been developed for use in commercial laser devices. These materials include titanium sapphire, and chromium doped lithium calcium aluminum fluoride [LiCaAlF6 or LlCAF] and, lithium strontium aluminum fluoride [LiSrAlF6 or LiSAF]., [Ref. 10, 11]. These tunable solid-state lasers are capable of producing high intensity tunable light efficiently.

Also emerging in the middle and late 1980's were new classes of nonlinear materials, particularly those of the orthophosphate and borate families (esp. potassium titanylphosphate KTP and Barium borate BBO). (Reference 7, J. T. Lin and C. Chen, "Choosing a Non-Linear Crystal", Lasers and Optronics, vol. 6, No. 11, pp. 59–63 (1987)). These new materials had sufficiently high nonlinear susceptibilities and damage thresholds to permit OPO's of more advanced designs to be developed. [Ref. 7, 12]. Further advances in nonlinear materials, tunable laser materials, and improved methods for pumping [Ref. 13–15] and tuning [Ref. 16] tunable laser materials using semiconductor diode lasers will provide improved embodiments of the inventions described below.

It is an object of the present invention to provide broadly tunable laser output with maximal coverage over the ultraviolet, infrared and visible spectral regions.

A further object of the present invention is to provide for simplified designs of tunable OPA's and OPO's.

A still further object of the present invention is to provide a narrow intense laser having narrow line width that is broadly tunable or suitable at a particular frequency.

SUMMARY OF THE INVENTION

The invention relates to tunable optical parametric amplifiers and oscillators that are pumped by the light from a tunable laser source. One possible embodiment of the invention uses a tunable solid-state laser pump, such as a vibronic alexandrite laser, and an OPA medium or nonlinear crystal, such as potassium titanyl phosphate KTP or barium borate BBO or lithium borate LBO. An OPO based upon this design is disclosed in reference 17. The second harmonic output from a tunable solid-state laser is also used to pump the OPA medium. A singly or doubly resonant cavity design is preferably used to reduce the oscillation threshold (i.e., the required pump beam power) of the OPO.

Angle tuning in conjunction with pump beam tuning is used to extend the wavelength range of the OPO outputs. This is accomplished by varying the angle θ in the OPA crystal.

DETAILED DESCRIPTION OF THE FIGURES

Figure 2:
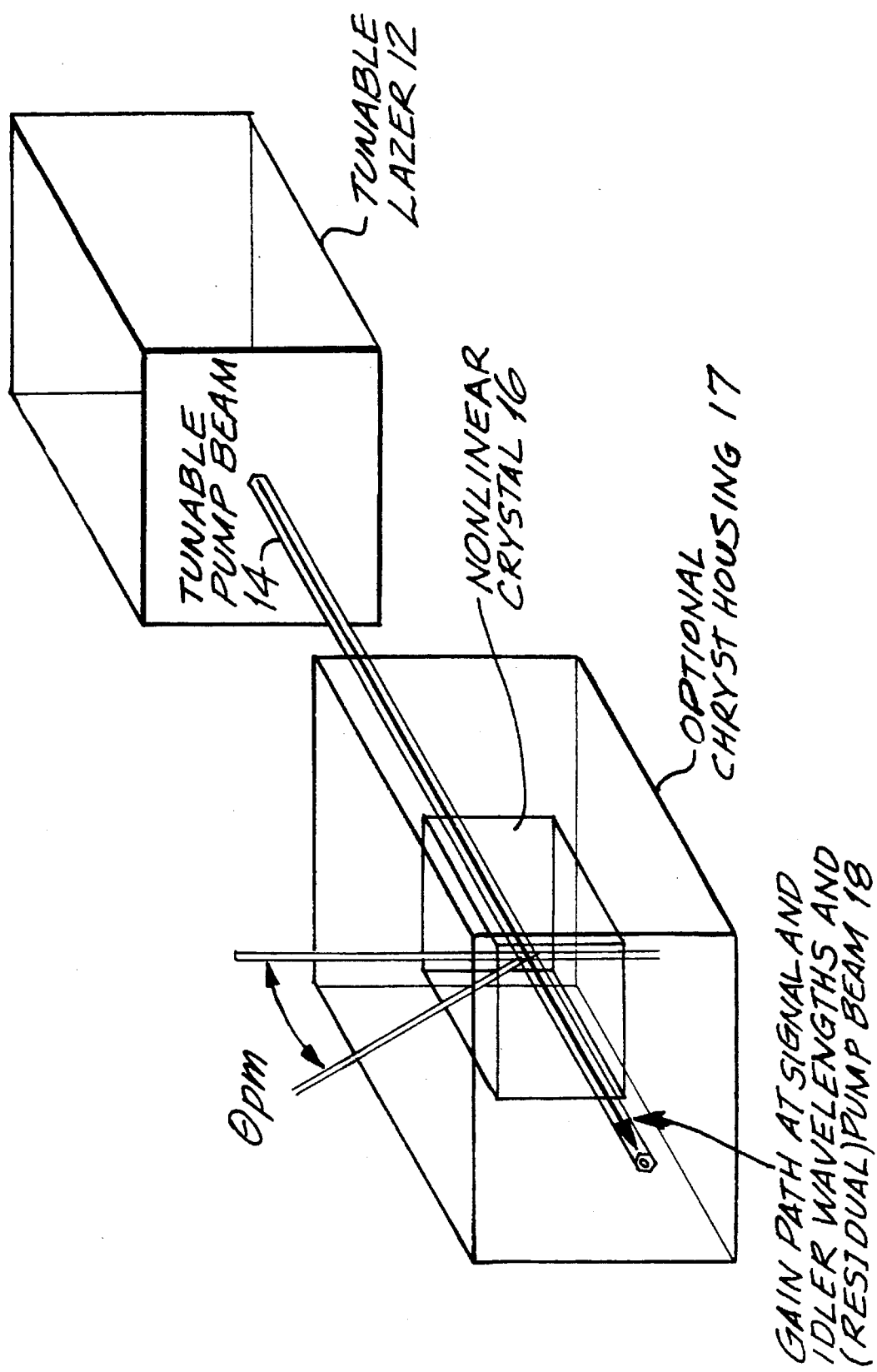
FIG. 2 shows a schematic diagram of Optical Parametric Amplifier Pumped by a Tunable Laser Source.

FIG. 2 shows a schematic diagram of an optical parametric amplifier 10 in accordance with the present invention. The tunable laser 12 provides a pump beam 14 which is impinged upon the gain producing nonlinear crystalline material 16, to produce a gainpath 18 at idler beam and signal beam wavelength. An optional crystal housing 17 is shown in the figure and the phase-matching angle is also indicated.

Figure 3:
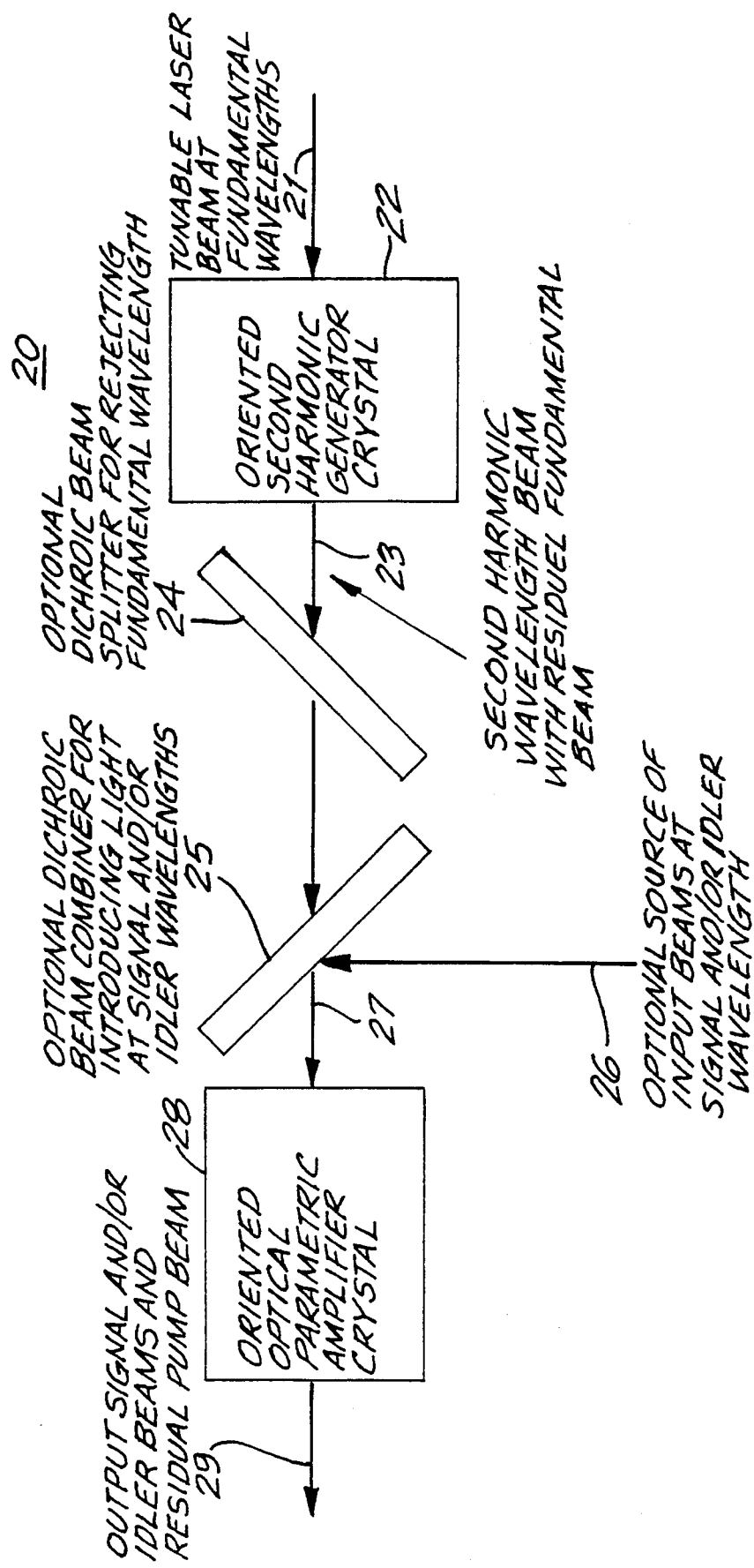
FIG. 3 shows a schematic diagram of Optical Parametric Amplifier Pumped by the Second Harmonic Wavelength of a Tunable Laser Source.

FIG. 3 shows an optical parameter amplifier 20 pumped by a tunable laser beam 21 from of tunable laser source (not shown) which impinges upon an oriented second harmonic generator crystal 22 to provide a second harmonic wavelength beam with residual fundamental beam 23. The beam 23 optionally passes through an optional dichroic beam splitter 24 for rejecting the fundamental wavelength and then through an optional dichroic beam combiner 25 for introducing light at signal and/or idler wavelengths. An optional input beam from an optional source (not shown) at the signal and/or idler wavelengths can be combined with the pump beam 23 with the optional combiner 25. The optionally combined beam 27 is impinged upon an oriented optical parametric amplifier crystal 28 to produce an output signal and/or idler beams and residual pump beam 29.

Figure 4:
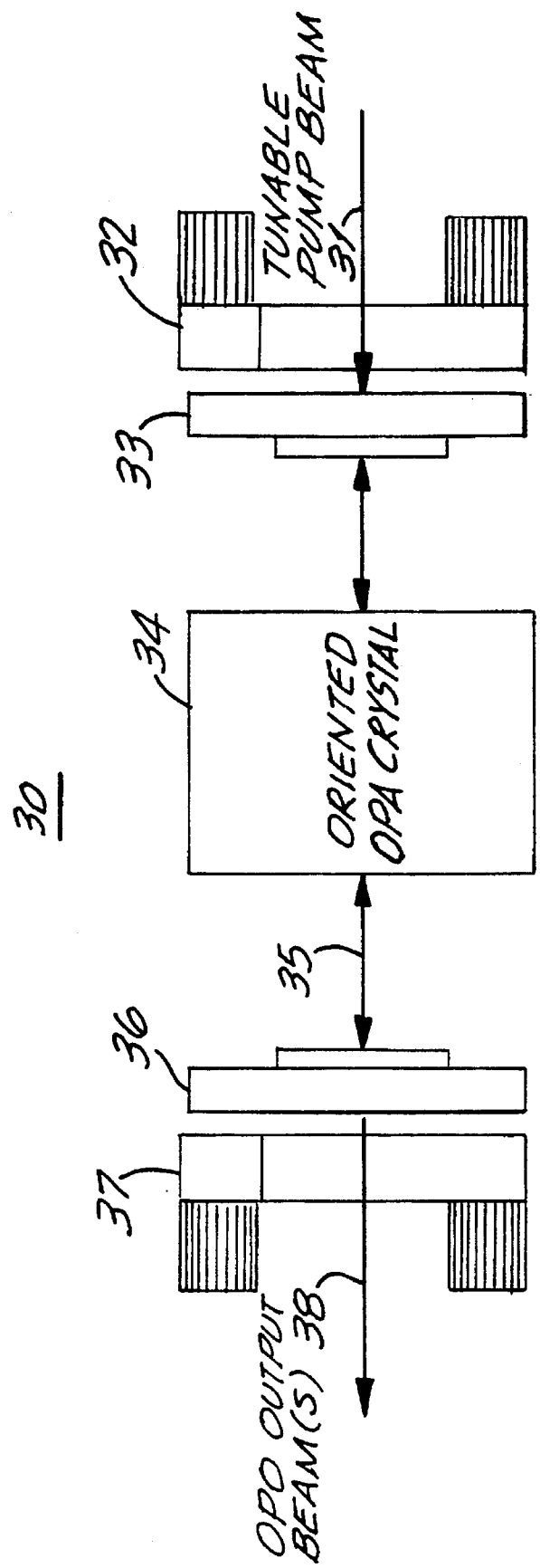
FIG. 4 shows a schematic diagram of Singly and Doubly Resonant Optical Parametric Oscillators Pumped by a Tunable Laser Source.

FIG. 4 shows a diagram of a singly and doubly resonant optical parametric oscillators 30 pumped by a tunable pump beam 31 from a tunable laser source (not shown). The tunable pump beam 31 can optionally be passed through Gimbal adjustor to provide a Gimbal adjustment for precise alignment of the beam. The beam 31 from the adjustor 32 passes through a mirror 33. Mirror 33 is reflective at the idler beam wavelength and in a singly resonant OPO system is transparent at the signal wavelength and in the doubly resonant OPO is partially reflecting at the signal wavelength. The pump beam passing through mirror 33 impinges upon the oriented OPA crystal 34 to provide output gain beam 35 which passes to mirror 36 and a second optional Gimbal adjustor 37 to provide the OPO output beam(s) 38.

Figure 5:
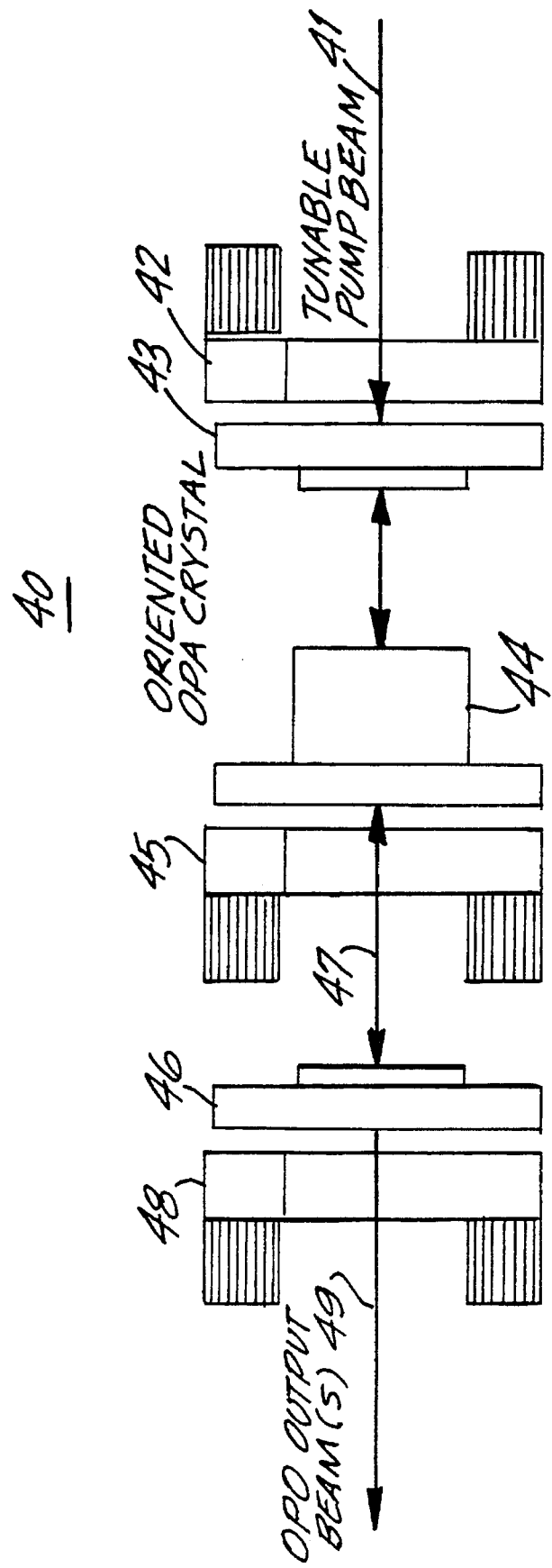
FIG. 5 shows a schematic diagram of Optical Parametric Oscillator Tuned by both Pump Laser Wavelength and Phase-match Angle Orientation of the OPA Crystal.

FIG. 5 shows an optical parametric oscillator 40 tuned by both pump laser wavelength and phasematch angle orientation of the OPA crystal. A tunable pump beam 41 from a tunable laser (not shown) is optionally passed through an optional Gimbal adjustor 42 to mirror 43. Mirror 43 is reflective at the idler wavelength. The beam from the mirror 43 passes to the oriented OPA crystal 44 whose phase angle can be adjusted by a Gimbal adjustor 45. The output gain beam 47 passes through mirror 47 which is transparent at the signal wavelength for singly resonant operation and partially reflecting a the signal wavelength for doubly resonant operation and an optional Gimbal adjustor 48 to provide OPO output beam(s) 49.

DETAILED DESCRIPTION OF THE INVENTION

The present invention relates to a method of light amplification comprising of the steps of 1) spatially orienting a birefringent crystal having a nonlinear susceptibility to phasematch light over some range of wavelengths, 2) propagating a pump laser beam through said crystal substantially along the phasematch direction. The pump laser beam has one or more wavelengths that can be tuned over some portion of the phasematch wavelength range of the birefringent crystal and has sufficient intensity to produce amplification at one or more wavelengths longer than the pump beam wavelengths. The instant method hence provides an idler beam and a signal beam gain. In most applications, one or more additional light beams are introduced into the crystal. The additional light beams have wavelengths, polarizations and propagation directions selected to experience amplification upon passage through the crystal. Typical pump beam intensities used to produce useful gain exceed 1 kW/cm$^2$. Their maximum intensity is limited by the (optical) damage threshold of the material, typically a few MW/cm$^2$ to a few GW/cm$^2$.

The instant invention further relates to an optical parametric amplifier (OPA) which comprises a birefringent crystal having a second order nonlinear susceptibility substantially different from zero oriented to phasematch incident light over some range of wavelengths and an optical pumping beam comprising light of suitable intensity from a tunable laser source. The pumping beam has a wavelength selected to be within the phasematch wavelength range of the crystal and is propagated substantially along the phasematch direction in the crystal. The OPA also has means for passing light at least one additional wavelength, wherein the additional wavelength is longer than the pump beam wavelength through the crystal substantially along a direction of phasematch for said longer wavelength.

Additionally, the present invention relates to an optical parametric oscillator (OPO) which comprises the optical parametric amplifier described above and feedback means for multiply repassing amplified light through the crystal substantially along the direction of phasematch.

The feedback means used in the invention can be a Fabry-Perot type resonator cavity in which the cavity has at least two mirrors with reflectivity at either an idler beam or signal beam wavelengths or at both idler and signal beam wavelengths.

Non-linear crystalline materials useful in the present invention include for example: AgGaSe$_2$, CdSe, KTP (potassium titanyl phosphate), Li IO$_3$, Li NbO$_3$, Ti$_3$ AsSe$_3$ (TAS), urea, β-BaB$_2$O$_4$ (BBO), potassium dihydrogen phosphate (KDP), Ag$_3$AsS$_3$, AgGaS$_2$, GaSe, LiNbP$_3$, chalcopyrites, α-HIO$_3$, KBe$_2$BO$_3$F$_2$ (KBBF), cesium dihydroarsenate (CDA), L-arginine phosphate (LAP), MgO:LiNbO$_3$, KNbO$_3$, LiB$_3$O5 and structure modulated LiNbO$_3$ or III–V semiconductor materials such as GaAs, InGaP, or GaP, and strained layer compositions thereof, or isomers or isotopically substituted analogs, esp. deuterated analogs (denoted as D-) of these materials.

Nonlinear crystals are ususally fabricated by cleaving the material along directions oriented with respect to the principal optical axes in order to phase match light having particular polarizations and wavelengths. Crystals that phase match parallel polarization signal and idler beams are designated type I. Preferred nonlinear crystals include: BBO which is type I or type II KTP.

Tunable solid-state lasers useful to provide the pumping beam employed in the present invention include, for example: lasers in which the gain medium contains transition metal ion impurities vibronically coupled to the crystal host, more specifically, gain materials include, alexandrite, LiSAF, LiCAF, LiSrGaF$_6$ or titanium doped sapphire. In preferred embodiments, the gain medium of the tunable solid state pump laser is itself energized by flashlamps or by semiconductor laser diodes.

The pumping beam has a wavelength which is dependent upon the gain material which is used in the tunable solid state laser. Normally, the wavelength will be 300 nm or longer. In the case of BBO, the pumping beam used has a wavelength of between 350 nm and 500 nm. For KTP, the pumping beam used has a wavelength longer than 400 nm since KTP absorbs light (an undersirable property) at short wavelength.

OPA's according to the present invention can use a pump laser having a continuous (cw) output or one having any pulse duration. However, pulsed lasers are preferred and preferred pulse durations are between 1 ns and 500 ns and preferred pulse energies are greater than 50 mJ. Additionally, the pump laser can operate in the long pulse (or "free running" mode) and the pulse duration is longer than 1 μs. Usually, the pulsed laser is Q-switched or mode-locked to make short duration, high power pulses.

Figure 6:
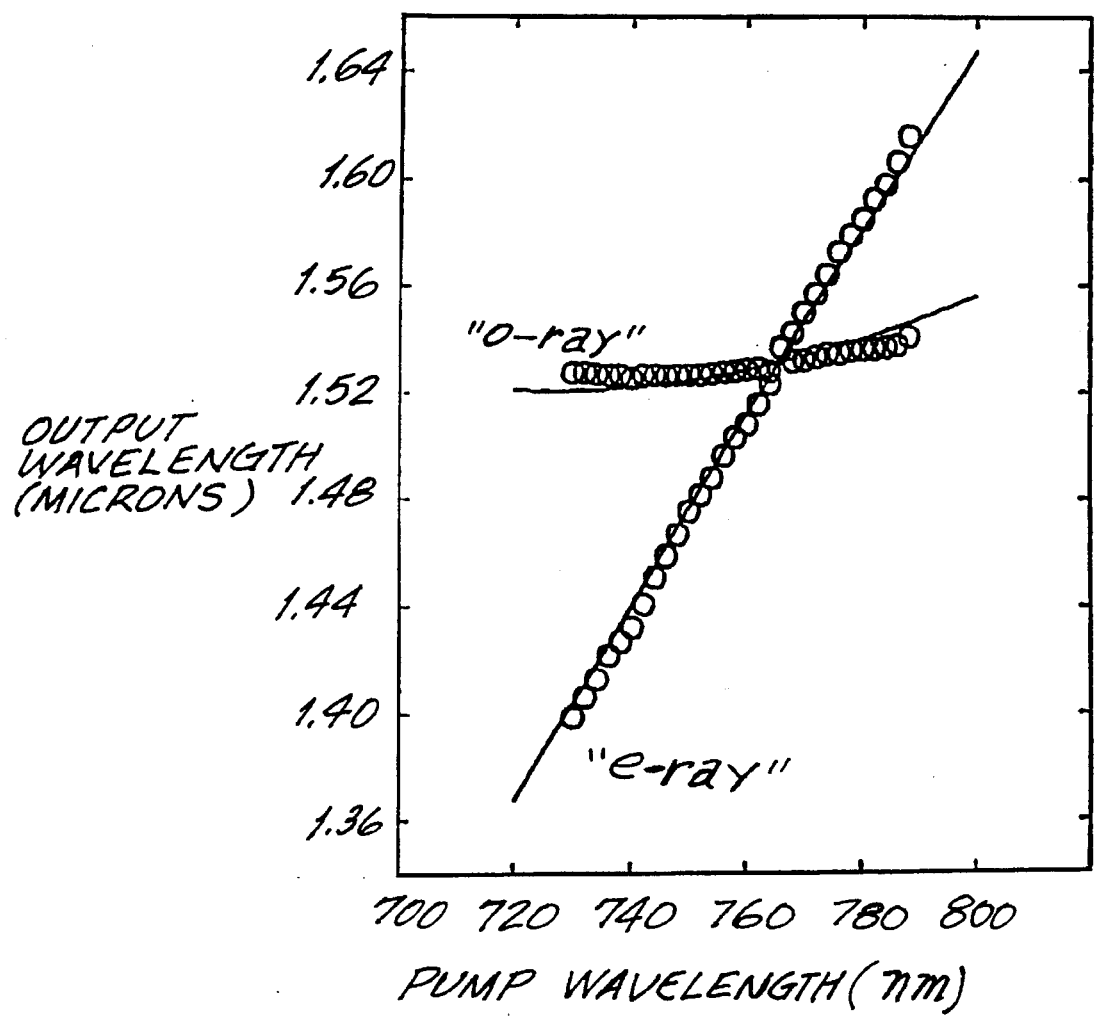
FIG. 6 provides a plot of output wavelength v. pump wavelength for an actual fixed angle pump beam tuning of a KTP OPO.

In a preferred embodiment of this invention the OPA medium is selected so that the idler beam frequency remains nearly fixed while signal beam tunes with the pump beam [FIG. 6]. In this design the effects of dispersion on the idler beam are minimized. Moreover, the reflective mirrors (and other optics), used in the idler cavity in both singly resonant (SR) and doubly resonant (DR) OPO's, do not have to be spectrally broad as required in designs employing fixed wavelength lasers to pump tunable OPA's and OPO's.

Importantly, this permits the use of fixed frequency or narrowly tunable light sources, esp. low power and continuous wave lasers such as diode pumped Nd:YAG or semiconductor diode lasers, to be used to control the frequency and bandwidth of a broadly tunable OPA or OPO by injection seeding the idler beam during its build up [Ref. 16].

Because many tunable solid-state lasers have relatively low [≦10–20 cm$^2$] stimulated emission cross sections they can produce longer duration pulses when Q-switched. Long duration pump pulses can give rise to long duration signal and idler pulses, and long pulse duration is compatible with narrow spectral bandwidth, an often desired property for both the pump beam and the OPO output.

The tunable light from the pump laser may be used to pump the OPA or OPO directly, or it may be used after some "conditioning". Conditioning may include processing to change the temporal and/or spectral and/or spatial characteristics of the beam, or the introduction of one or more nonlinear process to change its wavelength. Such nonlinear processes include second harmonic generation (SHG), third harmonic generation (THG), and/or the generation of higher harmonics of the fundamental frequency, the use of Stimulated Raman and or Stimulated Brillouin processes, and/or some combination of these processes. This conditioning of the pump beam can permit the OPO or OPA to operate at new frequencies or at improved efficiency, power, or stability. Conditioning processes may take place either inside or outside of the resonator of the pump laser as described in the present laser art [Ref. 5].

Figure 1:
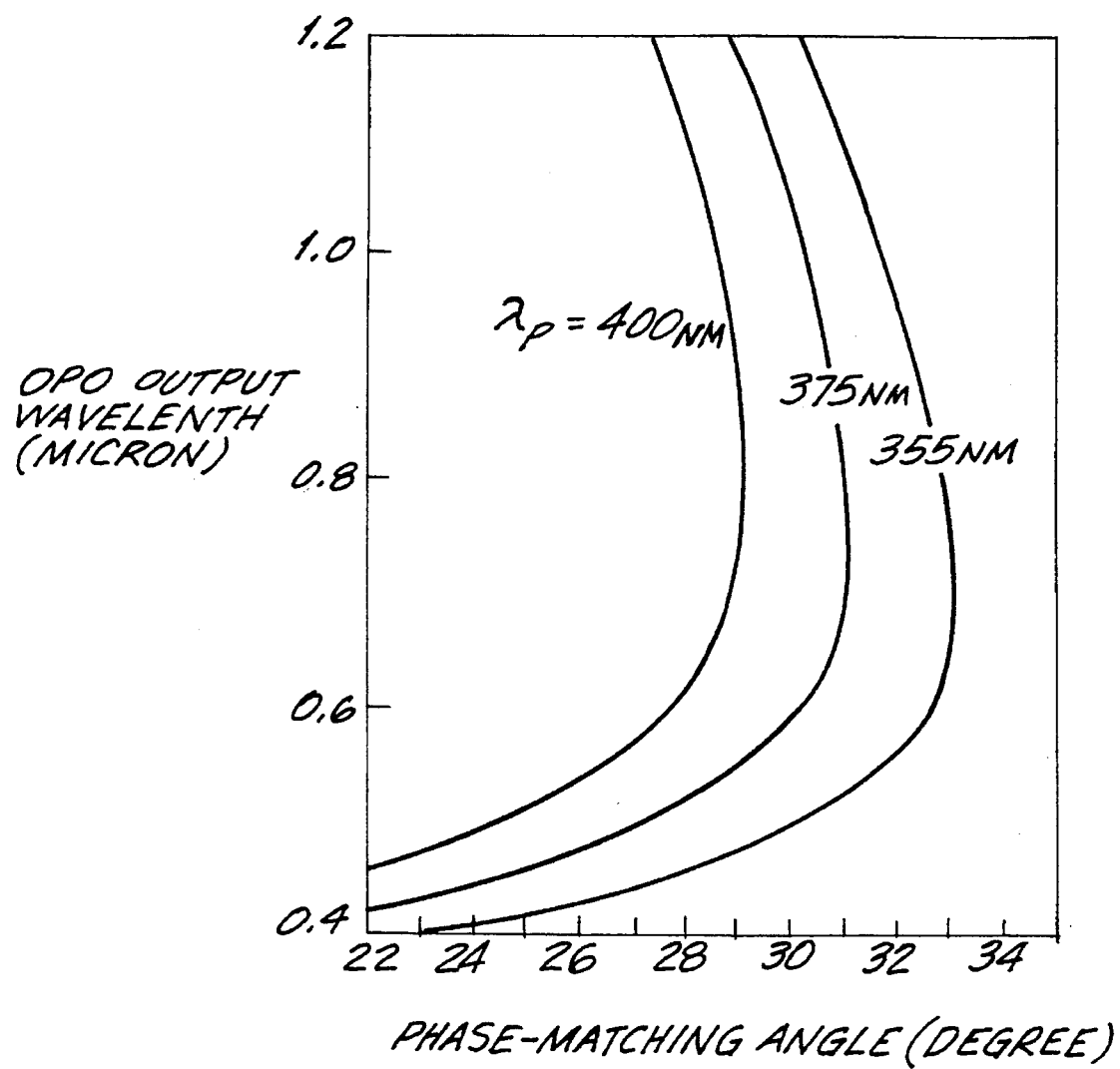
FIG. 1 shows a signal Output Wavelength Dependence on Phase-match Angle for a Type I BBO Optical Parametric Oscillator For Three Different Pump Laser Wavelengths.

Referring again to FIG. 1, the angular orientation can be computed for a particular choice of OPO crystal such as BBO pumped by the second harmonic of a tunable alexandrite laser. Let the pump wavelength be tuned between 400 and 355 nm corresponding to the second harmonic of the fundamental tuning range of 710–800 nm for the alexandrite laser. For phase match angles in BBO between 22° and 29°, phase matching will occur for any pump wavelength between 355 and 400 nm. However, at the smaller angles, only a relatively narrow range of output (signal) wavelengths will be produced. As the phase match angle is increased the tuning range becomes wider and shifts to longer wavelength. At about 29° any output (signal) wavelength between about 700 nm and 475 nm can be produced by tuning the pump wavelength and leaving the crystal orientation fixed. Note that by leaving the pump wavelength fixed, for this crystal cut, and varying only the angle between 23° and 33° output wavelengths between 400 and 800 (or longer) can be achieved.

It is noted that for both these processes the idler wavelength output is complementary to the signal relative to satisfying energy conservation with the pump. Such a BBO crystal angle tuned over only ±3° and pump tuned between 355 and 400 nm could provide light output at wavelengths from 400 nm to beyond 1200 nm. Actual fixed angle pump beam tuning of a (doubly resonant) KTP OPO is shown in FIG. 6 where the fundamental wavelength output of a tunable alexandrite solid-state laser was used as the pump source.

The following references are related to the present invention and form the background of the present invention and are mentioned by number, hereinabove:

1. J. A. Giordmaine and R. C. Miller, Phys. Review Letts., "Optical Parametric Oscillators in LiNbO3", in *Physics of Quantum Electronics*, P. L. Kelley, B. Lax, and P. E. Tannenwald, Eds., McGraw-Hill, NY, pp 53–56 (1966).

2. R. L. Byer and R. L. Herbst, "Parametric Oscillation and Mixing", in *Nonlinear Infrared Generation*, Topics in Applied Physics (series), vol. 16, Y. R. Shen (Ed.), Springer-Verlag, NY, pp. 81–137 (1977).

3. W. L Koechner, *Solid-State Laser Engineering*, Springer-Verlag, NY (1976); esp. pp 524–536 and references therein.

4. Y. R. Shen, *The Principles of Nonlinear Optics*, J. Wiley and Sons, NY, pp 117–140 (1984) and references therein.

5. W. L. Koechner, *Solid-State Laser Engineering*. Second Edition, Springer-Verlag, NY (1988); esp. pp 518–526 and references therein.

6. J. E. Bjorkholm, A. Ashkin, and R. G. Smith, "Improvement of Optical Parametric Oscillators by Nonresonant Pump Reflection", IEEE Journ. Quantum Electron., Vol. QE-6, No. 12, pp 797–799 (1970), and references therein.

7. J. T. Lin and C. Chen, "Choosing a Nonlinear Crystal", *Lasers and Optronics*, vol 6, No 11, pp. 59–63 (1987). J. T. Lin "Analysis of Frequency Conversion and Applications of New Nonlinear Crystals", Proceedings of the International Conf. on Lasers '86, Pp. 262–269 (1987).

8. R. Burnham, R. A. Stolzenberger, and A. Pinto, "Infrared Optical Parametric Oscillator in Potassium Titanyl Phosphate", IEEE Photonics Technology Letts., vol. 1, No. 1, pp 27–28 (1989).

9. R. Burnham, M. L. Diabal, W. Koechner, R. Stolzenberger, and A Pinto, "Optical Parametric Conversion in $KTiOPO_4$ (KTP)", in *Growth, Characterization, and Applications of Laser Host and Nonlinear Crystals*, SPIE vol. 1104, pp. 33–43 (1989).

10. J. C. Walling, "Tunable Paramagnetic-ion Solid-State Lasers", in *Tunable Lasers, Topics in Applied Physics* (series), vol. 59, L. F. Mollenauer and J. C. White (Eds.), Springer-Verlag, NY. pp. 331–398 (1987).

11. L. L. Chase and S. A. Payne, "New tunable Solid-State Lasers", Optics and Photonics News, pp. 16–19 (Aug. 1990) and references therein.

12. J. G. Haub, M. J. Johnson, B. J. Orr, and R. Wallenstein, "Continuously Tunable, Injection Seeded 20 Barium Borate Optical Parametric Oscillator: Spectroscopic Applications", Applied Phys. Letts., 58 (16), 1718 (1991).

13. R. Scheps, B. M. Gately, J. F. Myers, J. S. Krasinski, and D. F. Heller, "Alexandrite Laser Pumped by Semiconductor Lasers", Applied Phys. Letts., 56, pp 2288–2290 (1990).

14 R. Scheps, "Cr-doped Solid-States Lasers Pumped by Visible laser Diodes", Optical Materials, vol. 1, pp. 1–9 (1992) and references therein.

15. R. Scheps, "Laser-Diode-Pumped $Cr:LiSrGaF_6$ Laser", IEEE Photonics Technology Letts., 4 548 (1992).

16. J. Krasinski, P. Papanestor, J. A. Pete, and D. F. Heller, "Injection Locking Broadly Tunable, Q-Switched Alexandrite Lasers Using Semiconductor Laser Diodes," in *Tunable Solid State Lasers II*, A. B. Budgor, L. Esterowitz, and L. DeShazer, eds., Springer-Verlag, NY, pp. 191–195 (1986).

17. M. G. Janl, R. C. Powell, and R. Stolzenberger, "Pump Wavelength Tuning of a Near-Infrared Optical Parametric Oscillator", Applied Optics, vol. 31, No. 12, pp. 1998–2000 (1992).

All of the references which have been cited in this application are expressly incorporated herein by reference thereto. Although the invention has been described in conjunction with specific embodiments, it is evident that many alternatives and variations will be apparent to those skilled in the art in light of the foregoing disclosure and description. Accordingly, the invention is intended to embrace all of the alternatives and variations that fall within the spirit and scope of the appended claims.

We claim:

1. An optical parametric amplifier (OPA) comprising 1) a birefringent crystal having a second order nonlinear susceptibility substantially different from zero oriented to phasematch incident light over some range of wavelengths, wherein the birefringent crystal is oriented to cause phase matching to occur along a direction that is not at 90° to an optical axis, 2) an optical pumping beam comprising light of suitable intensity from a tunable laser source, said pumping beam having a wavelength selected to be within the phasematch wavelength range of said crystal and propagating substantially along the phasematch direction in said crystal.

2. An optical parametric amplifier according to claim 1, further comprising means for passing light at at least one additional wavelength, said additional wavelength being longer than said pump beam wavelength, through the crystal substantially along a direction of phasematch for said longer wavelength.

3. An optical parametric oscillator (OPO) comprising the optical parametric amplifier of claim 1 or claim 2 and feedback means for multiply repassing amplified light through the crystal substantially along the direction of phasematch.

4. The OPA of claim 1, wherein the birefringent crystal is oriented to cause phase matching to occur along a direction that is not at 90° to an optical axis.

5. An OPO comprising the OPA of claim 1 and a Frabry-Perot type optical resonator cavity, said cavity having at least two mirrors having reflectivity at both idler and signal beam wavelengths.

6. The OPO of claim 4 where said feedback means is a Fabry-Perot type resonator cavity, said cavity having at least two mirrors having reflectivity at either an idler beam or signal beam wavelengths or at both idler and signal beam wavelengths.

7. The OPA of claim 1 where said nonlinear crystal is selected from $AgGaSe_2$, CdSe, KTP (potassium titanyl phosphate), $Li\,IO_3$, $Li\,NbO_3$, $Ti_3\,AsSe_3$ (TAS), urea, $\beta\text{-}BaB_2O_4$ (BBO), potassium dihydrogen phosphate (KDP), $Ag_3AsS_3$, $AgGaS_2$, GaSe, $LiNbP_3$, chalcopyrites, $\alpha\text{-}HIO_3$, $KBe_2BO_3F_2$ (KBBF), cesium dihydroarsenate (CDA), L-arginine phosphate (LAP), $MgO{:}LiNbO_3$, $KNbO_3$, $LiB_3O5$ and structure modulated $LiNbO_3$ or III–V semiconductor materials selected from GaAs, InGaP, or GaP, and strained layer compositions thereof, or isomers, or isotopically substituted analogs of these materials.

8. The OPA of claim 1 wherein said nonlinear crystal is β-Barium Borate (BBO).

9. The OPA of claim 8 wherein said BBO is a type I cut of BBO.

10. The OPA of claim 8 where said BBO crystal is cut and aligned to have a phasematch angle between 20° and 35° and the pumping beam has a wavelength between 350 nm and 500 nm.

11. The OPA of claim 1 where the pumping beam is a tunable solid-state laser.

12. The OPO of claim 6 where said amplified light is allowed to build up from the idler or signal output of the optically pumped crystal.

13. The OPO of claim 6 or claim 7 where said amplified light builds up from a seed beam injected into the resonator cavity, said seed beam having a wavelength corresponding to one or more idler or signal beam wavelengths.

14. The OPA of claim 12 where the seed beam is produced by a semiconductor diode laser, or from a low power fixed wavelength or tunable solid-state laser.

15. The OPA of claim 1 where the OPA further comprises means for focussing light from the pump beam into the crystal.

16. The OPA of claim 1 wherein said nonlinear crystal is potassium titanyl phosphate (KTP).

17. The OPA of claim 15 where said nonlinear crystal is Type II KTP and said crystal has an orientation substantially close to $\Phi=0°$ and $\theta=53$.

18. The OPA of claim 16 where the pumping beam has a wavelength longer than 400 nm.

19. The OPA of claim 17 where signal and idler wavelengths are between 400 nm and 4000 nm.

20. The OPA of claim 10 where a gain medium of the tunable solid-state pump laser contains transition metal ion impurities vibronically coupled to the crystal host.

21. The OPA of claim 19 where the gain medium is alexandrite, $LiSrAlF_6$, $LiCaAlF_6$, $LiSrGaF6$, or Titanium doped sapphire.

22. The OPA of claim 1 where a gain medium of the pump laser is itself energized by semiconductor laser diodes.

23. The OPA of claim 1 where the gain medium is a solid-state material containing electronically excited color centers.

24. The OPA of claim 1 where the pump laser is a pulsed laser having pulse durations between 1 ns and 500 ns and pulse energies greater than 50 mJ.

25. The OPA of claim 1 where the pump laser operates in the long pulse (or "free running" mode) and the pulse duration is longer than 1 μs.

26. The OPA of claim 1 where the pump beam has undergone second or third harmonic conversion.

27. The OPA of claim 8 where said BBO crystal is at least 3 mm in aperture and at least 5 mm in length.

28. The OPO of claim 6 where said mirrors are curved, or where other optical elements having optical power and/or dispersion are placed inside the OPO resonator.

29. The OPO of claim 1 where the crystal is antireflection coated on surfaces through which the pump light passes.

30. The OPA of claim 1 where the crystal is oriented at Brewster's angle with respect to one or more of the beams.

31. The OPO of claim 3 where the angle of said birefringent crystal is varied in combination with tuning of the pump beam wavelength.

32. The OPA of claim 3 where said tunable pump laser source is operated at one or more fixed wavelengths.

33. The OPO of claim 6 or claim 4 where the pump laser is tuned to produce light at wavelengths within the absorption band of sodium (Na) atoms substantially near wavelengths within the absorption band of sodium (Na) atoms substantially near 589 nm.

34. The OPO of claim 33 where the wavelength of the pump laser is substantially near 377 nm and the idler wavelength is substantially near 1064 nm.

35. The OPO of claim 34 where the idler beam is injection seeded by light from a Nd:YAG laser.

36. The OPO of claim 6 wherein the reflectivities of said OPO resonator mirrors are designed to transmit and/or reflect light selectively at one or more of the wavelengths of the pump, idler, and/or signal beams.

37. The OPO of claim 36 wherein said wavelength selective mirrors are made from thin layers of dielectric materials deposited on glass, crystal, ceramic or metal substrates.

38. The OPO of claim 36 where said wavelength dielectric coatings are deposited on the OPA crystal faces which intersect the signal and idler beams pass.

39. The OPO of claim 3 where the output wavelength of said OPO is changed and/or stabilized by using a heating or cooling means, optionally in conjunction with a temperature sensor, to control the temperature of the OPA crystal.

40. The OPO of claim 7 or claim 4, where the signal and idler beams have substantially the same wavelength.

41. The OPO of claim 6 or claim 4, where the pump laser is a continuous wave laser.

42. The OPO of claim 6 or claim 4, where the pump laser has a peak power below 70 MW/cm².

43. The OPO of claim 6 or claim 4, where the pump laser has a pulse duration longer than 10 ns.

44. The OPA of claim 7, wherein the isotopically substituted analogs are deuterated analogs denoted as d-.

45. A method of light amplification comprising of the steps of 1) spatially orienting a birefringent crystal having a nonlinear susceptibility to phase match light over some range of wavelengths, wherein the birefringent crystal is oriented to cause phase matching to occur along a direction that is not at 90° to an optical axis, 2) propagating a pump laser beam through said crystal substantially along the phasematch direction, said pump laser beam having one or more wavelengths that can be tuned over some portion of the phasematch wavelength range of said crystal and having sufficient intensity to produce amplification at one or more wavelengths longer than said pump beam wavelengths, and 3) producing an idler beam and a signal beam each at wavelengths longer than said pump beam wavelength.

46. A method of claim 45, further comprising introducing one or more additional light beams into said crystal, said additional light beams having wavelengths, polarizations and propagation directions selected to experience amplification upon passage through said crystal.

* * * * *